June 1, 1943.  C. R. WASEIGE  2,320,686
PRESSURE CONTROL VALVE
Filed March 6, 1941  2 Sheets-Sheet 1

Inventor,
C. R. Waseige
By Glascock Downing & Seebold
Attys.

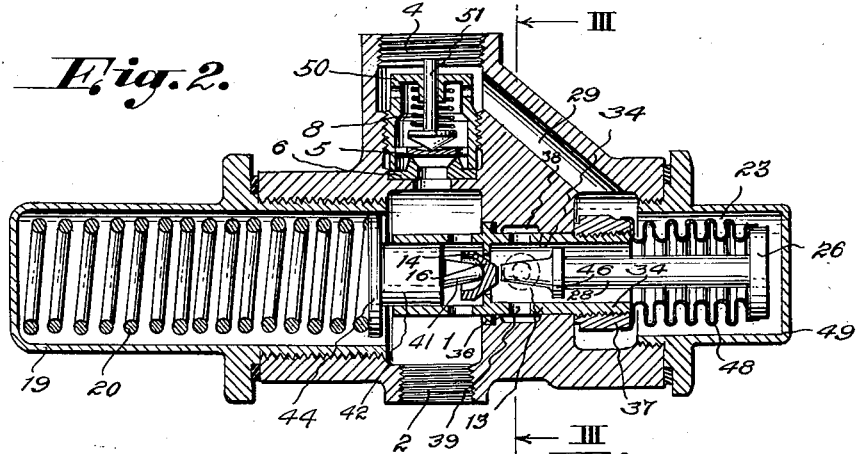
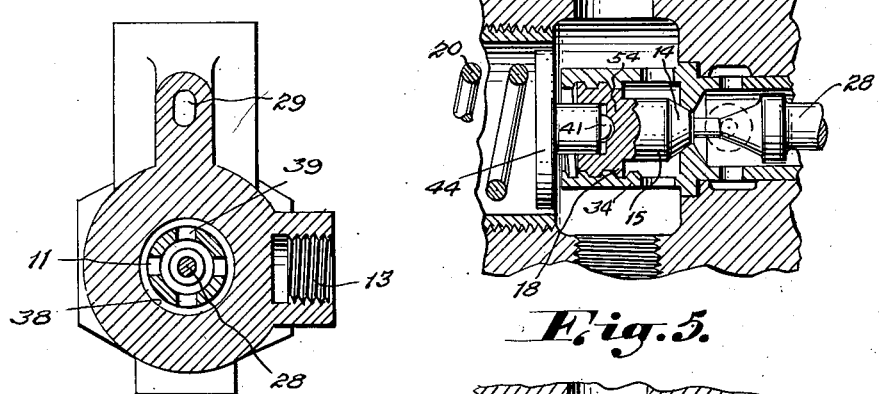
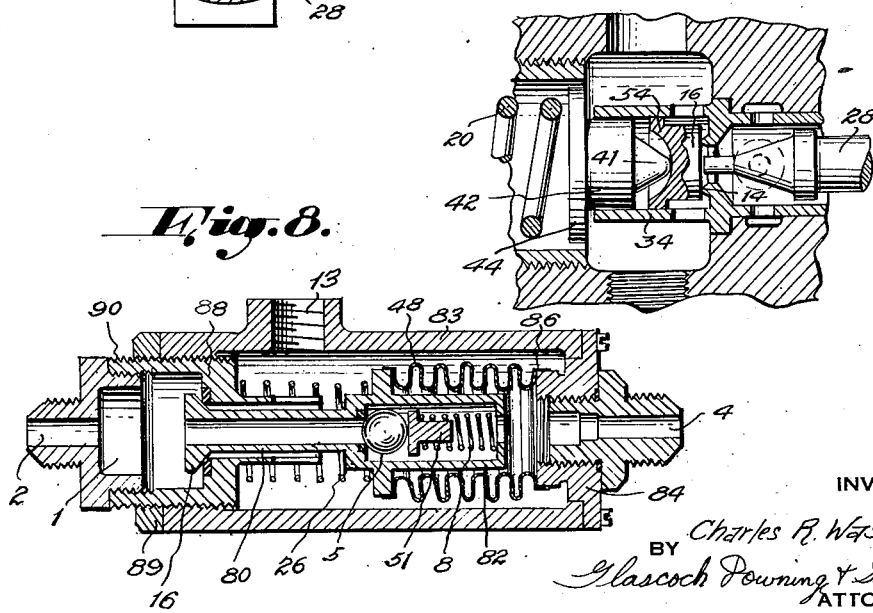

Patented June 1, 1943

2,320,686

UNITED STATES PATENT OFFICE 2,320,686

PRESSURE CONTROL VALVE

Charles Raymond Waseige, Rueil-Malmaison, France; vested in the Alien Property Custodian Application March 6, 1941, Serial No. 382,105
In France February 27, 1940

4 Claims. (Cl. 137—153)

Plants for distributing compressed air, more particularly plants of that kind provided on aircraft, are known which comprise at least a continuously driven blower connected with one or several reservoirs which are to be filled with high pressure air and used to supply various service appliances or the like. In order to avoid the necessity of constantly maintaining the discharge pressure of the blower at its maximum value, it has been proposed to insert between such a blower and the reservoir or reservoirs a device, known as pressure control valve, arranged on the one hand to cut the connection between said blower and the reservoir or reservoirs and connect the discharge or delivery conduit of said blower with a by-pass passage, when the pressure in the reservoir or reservoirs attains a predetermined value, known as the upper pressure limit; and on the other hand to re-connect the blower with the reservoir or reservoirs only when the pressure in the latter becomes lower than another pressure value, known as the lower pressure limit, substantially lower than said upper pressure limit.

The present invention relates to a control valve of the aforesaid kind which is of a simple construction allowing to achieve the purpose aimed at without necessitating rather complicated gearing members such as the cams and levers of the apparatus of the aforesaid mentioned type hitherto proposed.

According to this invention said pressure control valve comprises a chamber in which open the passages serving to connect said valves with the pressure gas inlet and, through an outlet valve, with the outlet or delivery passage through which the gas flows towards the reservoir or reservoirs; and said chamber is connected, on the other hand, with a by-pass through a non-balanced by-pass valve the body of which is urged in the opening direction by a movable or deformable member (piston, resilient diaphragm or the like) which exerts thereon a force the amount of which is dependent on the gas pressure in said outlet beyond said outlet valve, said force being counteracted by the force exerted on said by-pass valve by the gas under pressure contained in said chamber and by the action of a spring device.

By this arrangement, it is obvious that, during the rise of pressure in the reservoir or reservoirs, the by-pass valve is held applied on its seat as long as the force imparted to it by the said movable or deformable member (piston or diaphragm) is lower than the sum of the force of the resilient device and the force due to the difference between the pressure of the compressed gas and the pressure in the by-pass acting respectively on both sides of the by-pass valve. But as soon as the gas pressure in the outlet attains a sufficient value to impart to said movable or deformable member a force that counterbalances the aforesaid sum, the unbalanced by-pass valve opens suddenly, thereby connecting said chamber with the by-pass, while the closure of the aforesaid outlet valve cuts the connection between said chamber and the outlet to the reservoir. When the control valve is opened, the forces applied on both sides of the by-pass valve become equal, so that the only force urging said valve towards its seat is now that exerted by the spring device. It follows that the by-pass valve will be returned to its initial closure position only when the force exerted thereon by said member, which force is dependent on the pressure in the outlet, and, hence, the pressure in the reservoir, shall be substantially lower than said force and, therefore, than the pressure in the reservoir respectively which correspond with the opening of said valve.

The power of said yielding device and the effective areas of said movable member and valve seat are given relative values such that the two aforesaid pressures in the outlet are respectively equal to the values chosen for the upper and lower pressure limits.

According to another feature of the invention, the aforesaid movable member (piston or diaphragm) is arranged in a housing connected with the outlet beyond the outlet valve, the opposite side of said member, i. e., that which is not acted upon by the gas under pressure, being subjected to the pressure of the gas in said by-pass.

The pressure obtaining in the by-pass is of constant value, such as that of the atmosphere if the gases be released in the open air.

When said movable member is a piston, the housing may be given such a shape that it serves as a cylinder for said piston, which is provided with a sealing gasket, and if desired, said cylinder may be filled with a pressure transmitting liquid. Otherwise said piston may be formed as a plunger the sealing of which is best secured by a deformable member, which may be elastic and thus made a part of the spring device serving to return the by-pass valve.

Means for axially adjusting the position of the valve seat may be provided so as to permit of varying the tension of said spring device.

Said spring device will generally comprise a spring, which spring and said movable or deformable member (piston or diaphragm) will either be arranged so as to act independently upon the opposite sides of the by-pass valve and to apply to the latter the whole of the forces they produce, or be caused at least in part to co-operate in such a manner that the valve is substantially subjected only to the resultant of said forces.

In accordance with a preferred modification of this invention, the by-pass valve and the movable member (piston or diaphragm) are part of a movable tubular system carrying the said outlet valve and through which the delivery of the compressed gases is effected.

This arrangement simplifies the construction and is moreover advantageous in that said outlet valve, being unbalanced, causes the effective area of the movable member (piston or diaphragm) to vary according to whether it is open or closed, thus permitting to reduce the power of the spring of the resilient device.

In this case, the whole device may be arranged in such a manner that the flow of gas follows a straight path between the inlet and outlet passages through the outlet valve.

Further, in this modification the valve may consist of a screw threaded or other axially adjustable member which, when the sealing of the cylinder housing is carried out by means of a diaphragm, permits to adjust at will the tension of the resilient device as already described.

Other features and advantages of the invention will be apparent in the following description and with reference to the accompanying drawings given only by way of example.

In said drawings:

Figs. 2 and 3 show a modification in sectional elevation and in section on the line III—III of Fig. 2.

Figs. 4 and 5 show at an enlarged scale modifications of detail.

Fig. 8 is a sectional elevation showing another embodiment.

Figure 1:
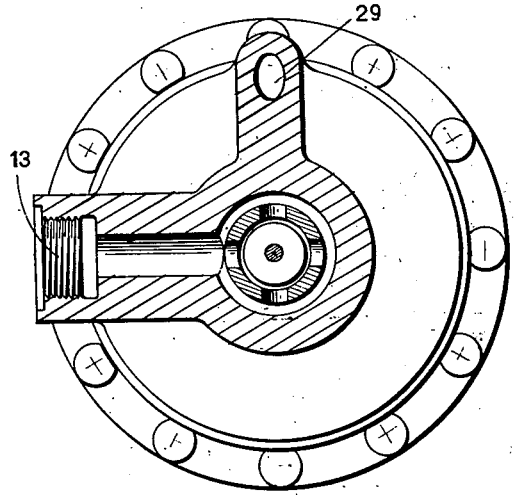
Fig. 1 is a side view of a first embodiment of the invention.

According to the embodiment shown in Fig. 1, the control valve comprises a chamber 1 in which opens a passage 2 connecting said chamber with the inlet of air or gas under pressure from the generator, and another passage opening into said chamber connects the latter with the outlet 4 directing said gas to the reservoir in which a pressure head is to be produced and maintained through a non-return outlet valve 5. The valve 5 is held on its seat 6 by a spring 8 and is so arranged that the gas can only flow in the direction from the control valve to the reservoir.

A duct 11 provided at one end of chamber 1 is connected with the open air or the like by a by-pass 13. One end of this duct forms the seat 14 for the by-pass valve 16 arranged in the chamber 1. Said valve is shaped like a conical plug or needle ending into an enlargement 17 having a reversible screw threaded connection 18 with the inner walls of a cylindrical sleeve projecting from the chamber 1, such valve being urged towards its seat 14 by a spring 20 provided in said sleeve. Spring 20 engages at one end with a face of the enlargement 17 and at the other end with a cap 19 holding it in a fixed position.

The duct 11 opens into the bottom of a cylindrical housing 23 which is coaxial with the by-pass valve 16 and in which is slidingly fitted a piston 26 provided with a packing cup made of leather or soft synthetic rubber. Said piston 26 is integrally connected with a rod 28 which projects through the duct 11 so as to engage said valve 16.

A conduit 29 connects the end of housing 23 removed from duct 11 with a part of the passage 3—4 situated beyond the outlet valve 5.

For improving the seal, the housing 23 may be filled with a liquid in contact with that side of piston 26 which is subjected to the pressure transmitted by conduit 29. The apparatus should then be arranged vertically and provided with an aperture 30, closed by a plug 31, for filling liquid into said housing.

The operation is as follows:

In the position of the parts as shown, the by-pass valve 16 rests upon its seat 14 and the air under pressure entering the inlet 2 flows through the chamber and then through the passage 3 without being hindered by the non-return valve 5, which opens.

The by-pass valve 16 is acted upon:

By the spring 20 and by a force equal to the area of the seat 14 multiplied by the difference between the pressure of the gas in the chamber and the pressure in the by-pass conduit 13 (usually equal to the atmospheric pressure), both forces urging the valve towards its seat.

By a force equal to the piston area 26 multiplied by substantially the same differential pressure as above, the small loss of head in the gas under pressure as it flows through the outlet valve being neglected, said force urging the by-pass valve in the opposite direction.

The above described parts are so designed with regard to their dimensions that the thrust of the piston counterbalances the forces acting in the opposite direction on the by-pass valve 16 for an amount of pressure equal to the upper pressure limit of the gas in the reservoir. The valve 16 now suddenly opens, connecting thereby the chamber 1 and the gas flowing from the generator with the by-pass 13. The valve 5 is closed, so that the pressure acting upon the piston 26 remains substantially at the same level as that of the gas in the reservoir.

As soon as the control valve opens, the forces acting upon both sides of the valve proper 16 are balanced and the latter is only subjected to the tension of spring 20 and to the force produced by the compressed gas acting upon the piston 26, so that it will not be returned against its seat by the spring 20 until the pressure in the housing 23 has been reduced to a level substantially below the aforesaid upper pressure limit. The area of seat 14 is so chosen that said pressure level is equal to the chosen lower pressure limit.

The gas generator is thus again connected with the reservoir, so that the inflation will be carried out.

In the modification of the invention shown in Figs. 2 and 3, the control valve is designed as a self-contained tight block, said block having three coupling nozzles 2, 4 and 13 respectively connecting same with the compressed gas generator, the reservoir and the release passage.

A tube 34 inserted in the cylindrical duct 11 provided in the wall of chamber 1 connects the latter with the by-pass 13. Said tube 34 projects at one end into chamber 1 and at the other end into a casing 23 which is in communication, through a duct 29, with the outlet 4 through which the gas under pressure flows to the reservoir. The tube 34 is held in fixed position by a collar 36 applied against one end of the duct 11, with interposition of a sealing gasket, by a nut 37 threaded on said tube so as to engage with the other end of duct 11.

The duct 11 is enlarged to form an annular recess 38 in which opens the by-pass 13 and ports 39 are provided in the tube 34 opposite this recess.

The inner flange 14 of tube 34 forms the seat of the conical valve body 16. The latter is provided at its end with a U-shaped recess part serving as a rest for the finger-like end of a sliding member 42 which is mounted in the tube 34, its other end carrying an enlarged flange on which rests the spring 20 held in position by a threaded hood 19. The by-pass valve 16 is in contact with a rod 28 having a collar 46 by means of which said rod is mounted with a sliding fit in the tube 34. The rod 28 projects from the piston 26, with which it may be integral. The piston 26 works as a plunger in the housing 23 and its periphery is connected by a bellows-like undulated sheath or diaphragm 48 to the nut 37 so as to secure gas tightness. A threaded hood 49, similar to the hood 19, is provided for sealing the housing 23, while permitting of an easy dismounting of the parts.

The outlet valve 5 co-operates with an independent seat member 6 held in position by a threaded cage 50 serving as a guide for a push-rod 51, a spring 8 urging the outlet valve towards its seat.

The operation is exactly similar to that of the form previously described and it is obvious that the tension of the resilient diaphragm 48 acts conjointly with the pressure of the spring 20, the power of which will be chosen accordingly.

Referring to Fig. 4, the seat 14 of the by-pass valve 16 is formed as an annular projection on the inside of tube 34 and this projection is conical so as to fit the conical end of said by-pass valve. The latter is further shown as provided with an extension 54 connected by a reversible screw threaded connection 18 with the inner end of tube 34. This extension 54 is provided with a recess within which engages a finger 41 integral with the plate 44 which serves as a rest for the spring 20. The sliding member 42 shown in Fig. 2 may then be dispensed with.

The modified construction shown in Fig. 5 differs from that shown in Fig. 2 only in that the part of the by-pass valve 16 that engages with the seat 14 is flat. The valve proper 16 is provided at its other end with a collared extension 54 having a sliding engagement with the inner wall of tube 34 and provided with the recess that receives the finger-like end 41 of the sliding member 42, at the other end of which is provided the flanged part 44 on which rests the spring 20.

Figure 6:
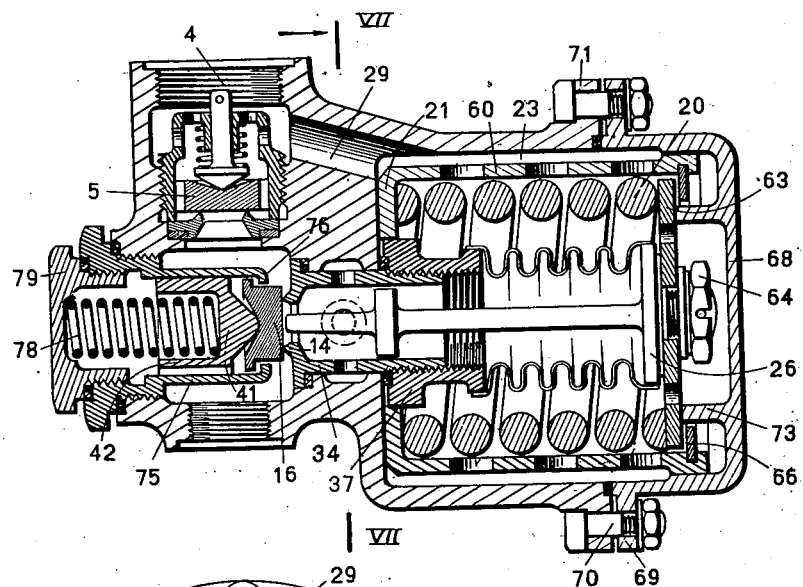
Figs. 6 and 7 are a sectional elevation and a section on the line VII—VII of Fig. 6, showing another modification.
Figure 7:
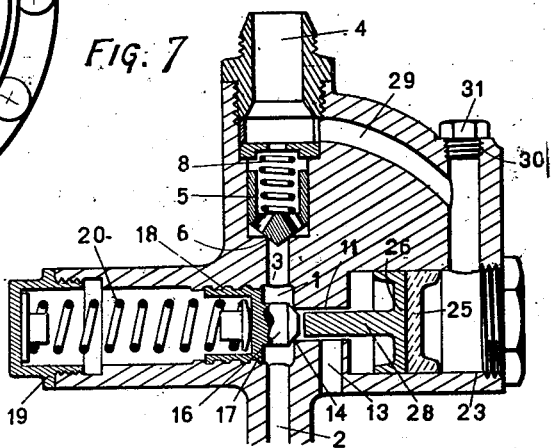

The modification shown in Figs. 6 and 7 differs from that shown in Figs. 2 and 3 in that the spring 20 is located in a cylindrical cage 60 arranged in the housing 23, the bottom 61 of which cage is pressed against the inner bottom of housing 23 and is provided with a central opening receiving the nut 37 for fastening the tube 34. This cage 60 is closed outwardly by a disc plate 63 fastened by a nut 64 to the head of piston 26 and serving as a rest for the spring 20. An inner projection 66, removably carried by the wall of cage 60, limits the movement of the disc 63 and prevents its being moved outwardly by the spring 20. The housing 23 is closed by a fluid tight cover 68 provided with a peripherical flange 69 secured by bolts 70 to a corresponding flange 71 of the control valve casing. The cover 68 is provided with an inward projection 73 serving as a stop for the disc 63 and projecting inwardly somewhat beyond the projection 66, the latter playing no role whatever when the cover 68 has been fastened. The by-pass valve 16 is guided by a cylindrical sleeve 75 threaded into the valve casing and terminated by an inner flange 76 which limits the axial movements of said valve 16. In a recess provided in that face of by-pass valve 16 removed from the seat 14 engages the finger-like end of a sliding member 42 mounted in the sleeve 75, said sliding member serving as a rest for a light spring 78 held by a threaded plug screwed into the end of sleeve 75.

The whole device is thus a compact construction the parts of which are readily removed or replaced.

By this arrangement, it will be apparent that the by-pass valve 16, urged in the direction of its seat by the light spring 78, is pushed by the rod 28 of the piston 26 in the opposite direction with a force substantially equal to the difference between the pressure of the spring 20 and the pressure exerted on the piston 26, against the acting on the by-pass valve 16 is the same as in in the outlet 4 which is connected with the housing 23 by the duct 29 opening into said outlet beyond the outlet valve 5. The resultant force acting on the by-pass valve 16 is the same as in the construction already described, so that the operation is similar.

In the embodiment form shown in Fig. 8, the by-pass valve 16 and the piston 26 are parts of a movable tubular system 80 through which the chamber 1, in which opens the inlet coupling 2 for the gas under pressure, connects with the outlet 4 arranged co-axially with said inlet coupling 2. The outlet valve 5 closes then the tubular opening of this movable tubular system and is arranged centrally of the piston 26. Said outlet valve is shown as formed by a ball urged in the direction of its seat by a push-rod 51, that serves as a rest for one end of a spring 8, the other end of which is seated upon an inner flange carried by an extension 82 of said system 80. The whole closing device is then confined in a casing 83 communicating through a by-pass 13 with a release chamber or the open air. The casing 83 is closed on the side adjacent the outlet by a cover 84 in the center of which is mounted a member having the outlet 4 therein. This cover 84 is provided with an inward projection 86 to which is fastened a bellows-like undulated resilient sheath 48, the other end of which is secured to the periphery of piston 26. Said sheath is thus submitted on its inside to the pressure of the gases in the outlet 4, which acts on the piston, and on its outside to the pressure in the by-pass 13.

The seat of the by-pass valve 16 is formed as a tubular member 88 mounted by means of an outer screw thread 90 in one end of casing 83 and stopped by a nut 89. This member is provided with a shoulder serving as a rest for one end of the spring 20, the other end of which is applied upon the piston 26, said spring urging the system 80 in the direction of the closing movement of the by-pass valve 16.

The air inlet coupling 2 is screwed into an inner screw threaded portion provided at the outer end of the tubular member 88.

It will be readily apparent that owing to its screw thread 90 this tubular member is adjustable axially, which permits of varying at will the elastic force applied to the system 80 by the elastic sheath 48 and the spring 20.

The operation of this embodiment differs from that described with reference to the other embodiments only in that the unbalanced outlet valve 5 has an additional function in that it increases, when closed, that effective area of piston 26 which is subjected to the pressure of the compressed gas in the reservoir, thus permitting to reduce the power of the spring 20.

The invention is obviously in nowise limited to the embodiments which have been shown and described above only by way of example.

While I have described what I at present consider preferred embodiments of my invention, it will be obvious to those skilled in the art that various changes and modifications may be made without departing from my invention and I therefore aim in the appended claims to cover all such changes and modifications as fall within the true spirit and scope of my invention.

What I claim is:

1. A control valve more particularly for a plant for distributing air on aircraft including a body provided with two internal chambers, a passage between said two chambers, an inlet opening to the first chamber, a tubular member mounted to reciprocate in said passage and projecting in the other chamber, said tubular member being provided with an enlarged portion forming a by-pass valve adapted to obturate said passage, an outlet valve carried by said member to allow the gas only to flow within said member from said first chamber, said further chamber being provided with an outlet and a by-pass, a pressure responsive member within said further chamber forming part of said tubular member, gas tight means between one face of said pressure responsive member and said outlet, said face being opposite said by-pass valve whereby pressure of the gas in said outlet beyond said outlet valve urges the by-pass valve in its opening direction and resilient means urging said outlet valve towards its closing position.

2. A control valve as claimed in claim 1 in which said inlet opening, said tubular member and said outlet are coaxial.

3. A control valve as claimed in claim 1 in which said tubular member and said outlet are coaxial and in which said pressure responsive member includes a piston in one with said tubular member and a bellows membrane connecting said piston and the said outlet.

4. A control valve as claimed in claim 1 in which said by-pass valve is adapted to cooperate with a seat and means for adjusting the position of said seat in a direction parallel with the axis of the tubular member for adjusting the tension of said resilient means.

CHARLES RAYMOND WASIEGE.